(12) United States Patent
Sallam

(10) Patent No.: US 9,769,200 B2
(45) Date of Patent: *Sep. 19, 2017

(54) METHOD AND SYSTEM FOR DETECTION OF MALWARE THAT CONNECT TO NETWORK DESTINATIONS THROUGH CLOUD SCANNING AND WEB REPUTATION

(71) Applicant: McAfee, Inc., Santa Clara, CA (US)

(72) Inventor: Ahmed Said Sallam, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,848

(22) Filed: Oct. 12, 2016

(65) Prior Publication Data

US 2017/0034188 A1    Feb. 2, 2017

Related U.S. Application Data

(63) Continuation of application No. 14/467,668, filed on Aug. 25, 2014, now Pat. No. 9,479,530, which is a
(Continued)

(51) Int. Cl.
*G06F 21/00*  (2013.01)
*H04L 29/06*  (2006.01)
*G06F 21/56*  (2013.01)

(52) U.S. Cl.
CPC ............ *H04L 63/145* (2013.01); *G06F 21/56* (2013.01); *G06F 21/566* (2013.01);
(Continued)

(58) Field of Classification Search
CPC ....... G06F 21/56; G06F 21/564; H04L 63/145
See application file for complete search history.

(56) References Cited

U.S. PATENT DOCUMENTS

| | | |
|---|---|---|
| 5,440,723 A | 8/1995 | Arnold et al. |
| 5,796,989 A | 8/1998 | Morley et al. |

(Continued)

FOREIGN PATENT DOCUMENTS

GB       2466922       7/2010

OTHER PUBLICATIONS

Final Office Action issued in U.S. Appl. No. 12/874,700; 17 pages, Dec. 14, 2015.
(Continued)

*Primary Examiner* — Lisa Lewis
(74) *Attorney, Agent, or Firm* — Baker Botts L.L.P.

(57) ABSTRACT

A method for detecting malware includes the steps of identifying a one or more open network connections of an electronic device, associating one or more executable objects on the electronic device with the one or more open network connections of the electronic device, determining the address of a first network destination that is connected to the open network connections of the electronic device, receiving an evaluation of the first network destination, and identifying one or more of the executable objects as malware executable objects. The evaluation includes an indication that the first network destination is associated with malware. The malware executable objects includes the executable objects that are associated with the open network connections that are connected to the first network destination.

20 Claims, 4 Drawing Sheets

Related U.S. Application Data continuation of application No. 12/694,988, filed on Jan. 27, 2010, now Pat. No. 8,819,826.

(52) U.S. Cl.
CPC ........ *H04L 63/1416* (2013.01); *G06F 21/564* (2013.01); *G06F 2221/2101* (2013.01); *H04L 63/126* (2013.01)

(56) References Cited

U.S. PATENT DOCUMENTS

| | | |
|---|---|---|
| 5,826,013 A | 10/1998 | Nachenberg |
| 6,240,530 B1 | 5/2001 | Togawa |
| 6,598,112 B1 | 7/2003 | Jordan et al. |
| 6,973,578 B1 | 12/2005 | McIchione |
| 6,986,042 B2 | 1/2006 | Griffin |
| 7,069,589 B2 | 6/2006 | Schmall et al. |
| 7,137,039 B2 | 11/2006 | Durrant et al. |
| 7,363,657 B2 | 4/2008 | Caccavale |
| 7,530,106 B1 | 5/2009 | Zaitsev et al. |
| 7,725,941 B1 | 5/2010 | Pavlyushchik |
| 7,730,040 B2 | 6/2010 | Reasor et al. |
| 7,765,481 B2 | 7/2010 | Dixon et al. |
| 7,788,359 B2 | 8/2010 | Lund et al. |
| 7,890,627 B1 | 2/2011 | Thomas |
| 8,001,606 B1 | 8/2011 | Spertus |
| 8,112,806 B1 | 2/2012 | Sobel et al. |
| 8,132,057 B2 | 3/2012 | Jann et al. |
| 8,225,406 B1 | 7/2012 | Nachenberg |
| 8,370,932 B2 | 2/2013 | Adams |
| 8,499,349 B1 | 7/2013 | Cruz et al. |
| 8,572,371 B2 | 10/2013 | Gassoway |
| 8,584,240 B1 | 11/2013 | Yang |
| 8,819,826 B2 | 8/2014 | Sallam |
| 2002/0066024 A1 | 5/2002 | Schmall et al. |
| 2003/0009482 A1 | 1/2003 | Benerjee et al. |
| 2003/0159070 A1 | 8/2003 | Mayer et al. |
| 2004/0168070 A1 | 8/2004 | Szor |
| 2004/0187023 A1 | 9/2004 | Alagna et al. |
| 2004/0236874 A1 | 11/2004 | Largman et al. |
| 2006/0031483 A1 | 2/2006 | Lund et al. |
| 2006/0075468 A1 | 4/2006 | Boney et al. |
| 2006/0101277 A1 | 5/2006 | Meenan et al. |
| 2006/0130141 A1 | 6/2006 | Kramer et al. |
| 2006/0137012 A1 | 6/2006 | Aaron |
| 2006/0206713 A1 | 9/2006 | Hickman et al. |
| 2006/0253458 A1 | 11/2006 | Dixon et al. |
| 2006/0294592 A1 | 12/2006 | Polyakov et al. |
| 2007/0006308 A1 | 1/2007 | Desouza et al. |
| 2007/0130351 A1 | 6/2007 | Alperovitch et al. |
| 2007/0162587 A1 | 7/2007 | Lund et al. |
| 2007/0214151 A1 | 9/2007 | Thomas et al. |
| 2007/0250927 A1 | 10/2007 | Naik et al. |
| 2008/0016339 A1 | 1/2008 | Shukla |
| 2008/0082662 A1 | 4/2008 | Dandliker et al. |
| 2008/0091912 A1 | 4/2008 | Fleming et al. |
| 2008/0133540 A1 | 6/2008 | Hubbard et al. |
| 2008/0178288 A1 | 7/2008 | Alperovitch et al. |
| 2008/0183996 A1 | 7/2008 | Field et al. |
| 2008/0189788 A1 | 8/2008 | Bahl |
| 2008/0209557 A1 | 8/2008 | Herley et al. |
| 2008/0244744 A1 | 10/2008 | Thomas et al. |
| 2008/0244748 A1 | 10/2008 | Neystadt et al. |
| 2009/0007100 A1 | 1/2009 | Field et al. |
| 2009/0044276 A1 | 2/2009 | Abdel-Aziz et al. |
| 2009/0070878 A1 | 3/2009 | Wang et al. |
| 2009/0077664 A1 | 3/2009 | Hsu et al. |
| 2009/0083852 A1 | 3/2009 | Kuo et al. |
| 2009/0119681 A1 | 5/2009 | Bhogal et al. |
| 2009/0165137 A1 | 6/2009 | Yoo et al. |
| 2009/0187991 A1 | 7/2009 | Freericks et al. |
| 2009/0222796 A1 | 9/2009 | Keohane et al. |
| 2009/0282476 A1 | 11/2009 | Nachenberg et al. |
| 2010/0058468 A1 | 3/2010 | Green et al. |
| 2010/0077480 A1 | 3/2010 | Yoo |
| 2010/0107252 A1 | 4/2010 | Mertoguno |
| 2010/0162391 A1 | 6/2010 | Loveland et al. |
| 2010/0186088 A1 | 7/2010 | Banerjee et al. |
| 2010/0192222 A1 | 7/2010 | Stokes et al. |
| 2010/0235647 A1 | 9/2010 | Buer |
| 2011/0107423 A1 | 5/2011 | Kolar Sunder et al. |
| 2011/0209219 A1 | 8/2011 | Zeitlin et al. |
| 2011/0209222 A1 | 8/2011 | Sharp et al. |
| 2011/0265182 A1 | 10/2011 | Peinado et al. |

OTHER PUBLICATIONS

Final Office Action issued in U.S. Appl. No. 12/694,960; 26 pages, Dec 21, 2015.
Secure Computing Corporation, "TrustedSource: The Next-Generation Reputation System for Enterprise Gateway Security", pp. 1-17, 2007.
Non-Final Office action issued in U.S. Appl. No. 12/694,960; 18 pages, Jun. 26, 2015.
Notice of Allowance received for U.S. Appl. No. 12/694,988, mailed on Apr. 25, 2014, 7 pages.
Final Office Action received for U.S. Appl. No. 12/694,988, mailed on Oct. 18, 2013, 12 pages.
Non-Final Office Action received for U.S. Appl. No. 12/694,988, mailed on Apr. 18, 2012, 12 pages.
Non-Final Office Action received for U.S. Appl. No. 12/694,988, mailed on Jul. 5, 2013, 10 pages.
Final Office Action received for U.S. Appl. No. 12/694,988, mailed on Sep. 26, 2012, 7 pages.
U.S. Appl. No. 12/694,960, filed Jan. 27, 2010, 36 pages.
Unites States Office Action; U.S. Appl. No. 12/694,960; Mar. 5, 2012, 19 pages.
U.S. Appl. No. 12/695,005, filed Jan. 27, 2010, 56 pages.
Unites States Office Action; U.S. Appl. No. 12/695,005; Apr. 19, 2012, 37 pages.
U.S. Appl. No. 12/695,011, filed Jan. 27, 2010, 42 pages.
Unites States Office Action; U.S. Appl. No. 12/695,011; Mar. 7, 2012, 25 pages.
U.S. Appl. No. 12/840,032, filed Jul. 20, 2010, 42 pages.
Unites States Office Action; U.S. Appl. No. 12/840,032; Jul. 6, 2012, 21 pages.
U.S. Appl. No. 12/874,700, filed Sep. 2, 2010, 25 pages.

| 304 | 306 | 308 | 310 | 312 | 314 | 316 |
|---|---|---|---|---|---|---|
| NETWORK DESTINATION | CONNECTED APPLICATION | PROTOCOL | SOCKET/ PORT | NETWORK DESTINATION ADDRESS | NETWORK DESTINATION HOST NAME | INBOUND/ OUTBOUND |
| example1.com | APP1 | TCP | 1 | N/A | example1.com | INBOUND |
| server.example2.com | APP2 | TCP | 2 | 222.222.222.222 | server.example2.com | OUTBOUND |
| 255.255.255.255 | APP3 | TCP | 3 | 255.255.255.255 | N/A | INBOUND |
| example3.com | APP1 | TCP | 4 | 444.444.444.444 | example3.com | OUTBOUND |
| example4.com | APP2 | UDP | 5 | 555.555.555.555 | example4.com | INBOUND |
| ... | ... | ... | ... | ... | ... | ... |

| 324 | 312 | 314 |
|---|---|---|
| MALWARE APPLICATION | NETWORK DESTINATION ADDRESS | NETWORK DESTINATION HOST NAME |
| APP1 | N/A | example1.com |
| | 444.444.444.444 | example3.com |
| APP2 | 222.222.222.222 | server.example2.com |
| | 555.555.555.555 | example4.com |
| ... | ... | ... |

METHOD AND SYSTEM FOR DETECTION OF MALWARE THAT CONNECT TO NETWORK DESTINATIONS THROUGH CLOUD SCANNING AND WEB REPUTATION

RELATED APPLICATION

This application is a Continuation of U.S. patent application Ser. No. 14/467,668 filed Aug. 25, 2014, which is a Continuation of U.S. patent application Ser. No. 12/694,988 filed Jan. 27, 2010, which are incorporated herein by reference in their entirety.

TECHNICAL FIELD OF THE INVENTION

The present invention relates generally to computer security and malware protection and, more particularly, to a method and system detecting malware that connect to network destinations outside of an infected machine, through cloud scanning and web reputation.

BACKGROUND

Server side polymorphism is a difficult challenge when creating anti-virus techniques. In server side polymorphism, a malware server generates different permutations of the same binary. The permutated version is then downloaded by a client side malware deployed on an infected end point. The new permutations version is used for further propagation, as anti-virus software may not yet recognize the new permutated version. To make contact with the server to download the new mutated version, the client side malware must use an unsuspecting computer's network connection. A server may unsuspectingly host the permutated malware to be downloaded, as it may have been commandeered by a malware server.

Other kinds of malware also need to "phone home" to a server as well. For example, downloaders may contact a server to download other binaries to initiate or continue attacks. Spyware, password stealers, and the like must contact a server to upload collected data. Some malware must contact a server in order to let an attacking process take control of the infected machine.

Malware may include the varieties described above. Malware may also include, but is not limited to, sources of spam, sources of phishing attacks, sources of denial-of-service-attacks, viruses, loggers, Trojans, adware, or any other digital content that produces unwanted activity.

SUMMARY

A method for detecting malware includes the steps of identifying one or more open network connections of an electronic device, associating one or more executable objects on the electronic device with the one or more open network connections of the electronic device, determining the address of a first network destination that is connected to the open network connections of the electronic device, receiving an evaluation of the first network destination, and identifying one or more of the executable objects as malware executable objects. The evaluation includes an indication that the first network destination is associated with malware. The malware executable objects includes the executable objects that are associated with the open network connections that are connected to the first network destination.

In a further embodiment, an article of manufacture includes a computer readable medium and computer-executable instructions. The computer-executable instructions are carried on the computer readable medium. The instructions are readable by a processor. The instructions, when read and executed, cause the processor to identify a one or more open network connections of an electronic device, associate one or more executable objects on the electronic device with the one or more open network connections of the electronic device, determine the address of a first network destination that is connected to the open network connections of the electronic device, receive an evaluation of the first network destination, and identify one or more of the executable objects as malware executable objects. The evaluation includes an indication that the first network destination is associated with malware. The malware executable objects comprise the executable objects that are associated with the open network connections that are connected to the first network destination.

In a further embodiment, a method of evaluating the reputation of a network destination includes the steps of receiving information about a network destination from a monitor, accessing reputation information about the network destination in a reputation database, evaluating whether reputation information indicates that the network destination is associated with malware, and sending the evaluation to the monitor. The monitor is scanning an electronic device for malware. The network destination is in communication with an executable object on the electronic device.

In a further embodiment, an article of manufacture includes a computer readable medium and computer-executable instructions. The computer-executable instructions are carried on the computer readable medium. The instructions are readable by a processor. The instructions, when read and executed, cause the processor to receive information about a network destination from a monitor, access reputation information about the network destination in a reputation database, evaluate whether reputation information indicates that the network destination is associated with malware, and send the evaluation to the monitor. The monitor is scanning an electronic device for malware. The network destination is in communication with an executable object on the electronic device.

In a further embodiment, a system for detection of malware includes a monitor and a reputation application. The monitor is configured to identify one or more open network connections of an electronic device, identify one or more executable objects on the electronic device using the one or more open network connections of the electronic device, and determine the address of a first network destination that is connected to the one or more open network connections of the electronic device. The reputation application configured to receive information about the first network destination from the monitor, access reputation information about the first network destination in a reputation database, evaluate whether reputation information indicates that the first network destination is associated with malware, and return the evaluation to the monitor. The monitor is further configured to receive an evaluation of the first network destination, and determine one or more malware executable objects. The evaluation includes an indication that the first network destination is associated with malware. The one or more malware executable objects comprise the executable objects in communication with the first network destination evaluated to be associated with malware.

BRIEF DESCRIPTION OF THE DRAWINGS

For a more complete understanding of the present invention and its features and advantages, reference is now made to the following description, taken in conjunction with the accompanying drawings, in which:

FIG. 3A is an illustration of example information that may be shared between a monitor and a reputation server concerning network destinations connected to an electronic device.

FIG. 3B is an illustration of example information that may be shared between a monitor and a reputation server concerning network destinations connected to an electronic device and associated with an application which in turn is associated with malware.

DETAILED DESCRIPTION

Figure 1:
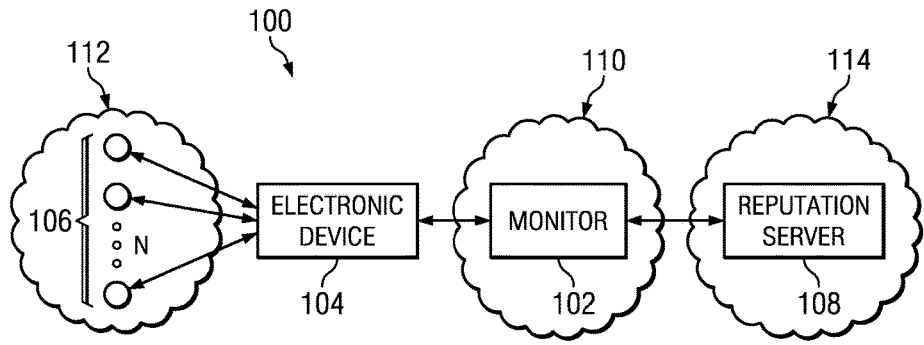
FIG. 1 is an illustration of an example system for defeating malware that communicate with network servers through connection scanning and web reputation.

FIG. 1 is an illustration of an example system 100 for defeating malware that communicate with network servers through connection scanning and web reputation. System 100 may comprise a monitor 102, an electronic device 104, and a reputation server 108. Monitor 102 may be configured to scan electronic device 104 for possible malware that communicate with network destinations 106 to carry out malicious activities. Monitor 102 may be configured to communicate with reputation server 108 to determine whether applications or network connections belonging to electronic device 104, or network destinations 106 connected through network 112 to electronic device 104, comprise malware or malicious activities associated with malware. Reputation server 108 may be configured to evaluate the network connections, and monitor 102 may be configured to receive the evaluation from reputation server 108.

In one embodiment, monitor 102 may be configured to operate in a cloud computing scheme. Monitor 102 may comprise software that resides on network 110, and may be loaded and executed on a machine in network 110. Monitor may be communicatively coupled to electronic device 104 through network 110 or any other suitable network or communication scheme. Monitor may scan electronic device 104 without executing on electronic device 104. Monitor 102 may be communicatively coupled to reputation server 108 through network 110, network 114, or both. The reputation server 108 may comprise a server on network 114. In one embodiment, monitor 102 and reputation server 108 may reside on the same network. In one embodiment, monitor 102 and reputation server 108 may reside on the same hardware.

In one embodiment, monitor 102 may reside on electronic device 104. Monitor 102 may be loaded and executed on electronic device 104. Monitor 102 may be communicatively coupled to reputation server 108 through network 114, or any other suitable network or communication scheme.

Networks 110, 112, 114 may comprise any suitable networks for communication between electronic device 104, monitor 102, network destinations 106, and reputation server 108. Such networks may include but are not limited to: the Internet, an intranet, wide-area-networks, local-area-networks, back-haul-networks, peer-to-peer-networks, or any combination thereof.

Electronic device 104 may comprise any device configurable to interpret and/or execute program instructions and/or process data, including but not limited to: a computer, desktop, server, laptop, personal data assistant, or smartphone.

Figure 2:
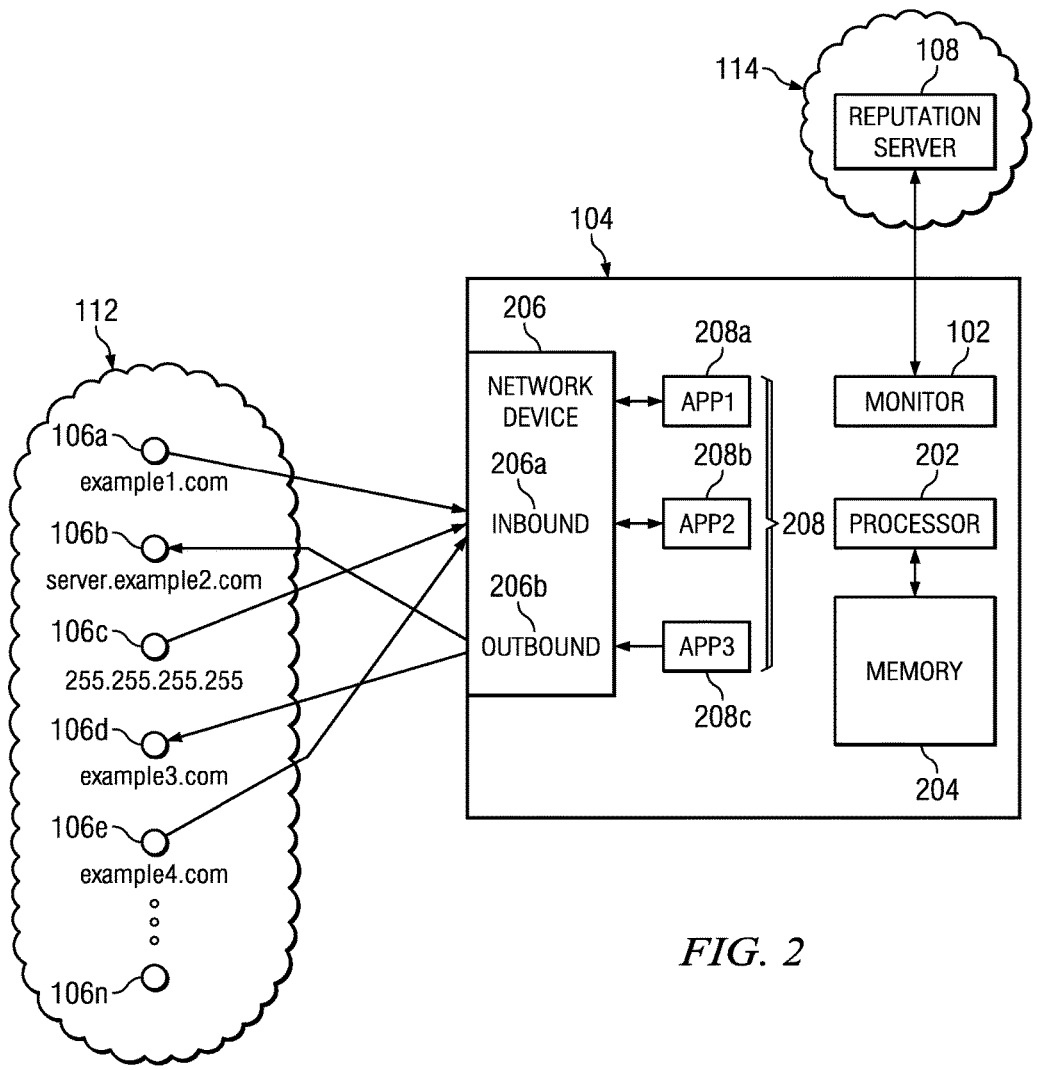
FIG. 2 is an illustration of some portions of the system of FIG. 1 for scanning an electronic device.

FIG. 2 is an illustration in further detail of some portions of the system 100 for scanning an electronic device 104. Electronic device 104 may comprise a processor 202 coupled to a memory 204, a network device 206, and one or more applications 208. Monitor 102 may reside on electronic device 104, or on any other electronic device, server, or other suitable mechanism to scan electronic device 104 for possible malware that communicate with network destinations 106 to carry out malicious activities. Monitor 102 may comprise any application, process, script, module, executable, server, executable object, library, or other suitable digital entity. Monitor 102 may be communicatively coupled to reputation server 108 over network 114. Monitor 102 may be configured to reside in memory 204 for execution by processor 202 with instructions contained in memory 204.

Processor 202 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 202 may interpret and/or execute program instructions and/or process data stored in memory 204. Memory 204 may be configured in part or whole as application memory, system memory, or both. Memory 204 may include any system, device, or apparatus configured to hold and/or house one or more memory modules. Each memory module may include any system, device or apparatus configured to retain program instructions and/or data for a period of time (e.g., computer-readable media).

Network device 206 may be a virtual or actual device. Network device 206 may be configured to, among other things, communicate between electronic device 104 and one or more other electronic devices, software, servers, or networks, such as network 112 or network destinations 106. Network device 206 may comprise one or more inbound network ports 206a for receiving communications and or more outbound networked ports 206b for sending communications. Network device 206 may comprise any suitable combination of hardware and/or software to establish communication with electronic device 104 over a network. In one embodiment, network device 206 may be coupled externally to electronic device 104. One or more applications 106 may be coupled or connected to network device 206, and accordingly use network device 206 to accomplish communication tasks. Network device 206 may be configured to facilitate any suitable communications protocol to conduct communications for electronic device 104 or applications 208 over a network.

Applications 208 may be an application configured to operate on electronic device 104. Applications 208 may be configured to reside in memory 204 for execution by processor 202 with instructions contained in memory 204. Applications 208 may be of any kind of digital entity suitably configured for operation on electronic device 104. Applications 208 may comprise, but are not limited to, a program, process, executable, application, driver, operating system, module, source code, object code, meta-code, shared library, system executable object, script, object file, or a combination of these elements. Applications 208 may be coupled to network device 206. Applications 208 may be communicatively coupled to network device 206. Applications 208 may make use of network device 206 through any suitable method. Monitor 102 may be configured to determine in part whether applications 208 comprise malware. In one embodiment, monitor 102 may be configured to determine whether applications 208 comprise malware that communicates with a malware server.

Network destinations 106 may comprise websites, servers, machines, processes, applications, or other entities residing on a network 112. Network destinations 106 may be communicatively coupled to electronic device 104 through network 112. Network destinations 106 may be communicatively coupled to network device 206. Network destinations 106 may be communicatively coupled to the inbound network ports 206a and/or outbound network ports 206b. Network destinations 106 may be communicatively coupled with one or more applications 208 of electronic device 104 through network 112, and through network device 206. Network destinations 106 may be identifiable through an address. In one embodiment, the address of network destination 106a may comprise an Internet Protocol address of 255.255.255.255. In one embodiment, the address of network destinations 106 may comprise a host name, domain or server name. For example, network destination 106b may be identified as "widget.example.com."

Monitor 102 may be configured to determine and enumerate the open network connections of network device 206. Monitor 102 may be configured to determine the open network socket connections of network device 206. Monitor 102 may be configured to determine the open network connections of network device 206 when the driver for network device 206 is operational, indicating that the network device 206 is in use. Monitor 102 may be configured to determine the connection type of the open network connections of network device 206. In one embodiment, monitor 102 may be able to determine transport control protocol ("TCP") connections and/or user datagram protocol ("UDP") connections. Monitor 102 may be configured to determine the direction of the open network connections of network device 206. In one embodiment, monitor 102 may be able to determine inbound connections at inbound network ports 206a and/or outbound connections at outbound network ports 206b. Monitor 102 may be configured to obtain the identity of the entity at the other end of the open network connections of network device 206. In one embodiment, monitor 102 may be configured to obtain the addresses of network destinations 106. In a further embodiment, monitor 102 may be configured to obtain the internet protocol ("IP") addresses and/or host names of network destinations 106. Monitor 102 may be configured determine which applications 208 may be using the connection to network destinations 106.

FIG. 3A is an illustration of example information that may be shared between monitor 102 and reputation server 108 concerning network destinations connected to electronic device 104. Monitor 102 may be configured to compile a table 302 of the network destinations, and for each the applications 306 associated with the network destinations, the protocol 308 used for each connection, the socket and/or port 310 used for each connection, the network destinations' addresses 312, the network destinations' host names 314, and/or whether the ports are inbound or outbound 316.

The specific values shown in FIG. 3A are for illustration purposes only. For example, APP1 208a may have an inbound network connection to the network destination "example1.com" 106a, of type TCP, on port 1, with the host name example1.com. APP2 208b may have an outbound network connection to the network destination "server.example2.com" 106b, of type TCP, on port 2, with the host name server.example2.com and the IP address 222.222.222.222. APP3 208c may have an inbound network connection to the network destination "255.255.255.255" 106c, of type TCP, on port 3, with the IP address 255.255.255.255. APP1 208a may also have an outbound network connection to the network destination "example3.com" 106d, of type TCP, on port 4, with the host name example3.com and the IP address 444.444.444.444. APP2 208b may also have an inbound network connection to the network destination "example4.com" 106e, of type UDP, on port 5, with the host name example4.com and the IP address 555.555.555.555. Although particular information and formats are shown are illustrated in FIG. 3A, any suitable information and format may be exchanged between monitor 102 and reputation server 108.

Referring back to FIG. 2, monitor 102 may be configured to communicate with reputation server 108 to determine the reputation of network destinations 106. Monitor 102 may be configured to receive an evaluation of network destinations 106 from reputation server 108. Reputation server 108 may be configured to determine whether a given network destination 106 is known to host malware or not. Monitor 102 may be configured to send the information of table 302 of network destinations, or additional information regarding the applications 208 of electronic device, to reputation server 108. Monitor 102 may be configured to send such information reputation server 108 with an initial query concerning network destinations 106, if reputation server 108 determines that network destinations 106 may be known to host malware, and/or upon request from reputation server 108.

Monitor 102 may be configured to protect electronic device 104 based on information that one or more network destinations 106 are known to host malware. Monitor 102 may be configured to protect electronic device 104 in any way suitable to prevent malware associated with network destinations 106 known to host malware, or with applications connecting to network destinations 106 known to host malware, from affecting electronic device 104. Monitor 102 may be configured to protect electronic device 104 directly, through active or passive methods. Monitor 102 may be configured to make use of, configure, and/or communicate with other processes, devices, applications, or entities on or with access to electronic device 104 to protect electronic device 104. In one embodiment, monitor 102 may be configured to block access to network destinations 106 known to host malware.

In one embodiment, monitor 102 may be configured to clean electronic device 104 of applications 208 connected to a network destination known to host malware. Monitor 102 may be configured to clean electronic device of malware hosted by network destination 106. Execution of malware hosted by network destination 106 may be blocked, quarantined or removed. Monitor 102 may be configured to undo modifications to electronic device 104 made in relation to malware. Monitor 102 may be configured to monitor the behavior of applications 208 connected to a network destination 106 hosting malware. In one embodiment, monitor 102 may be configured to analyze the network connections utilized by applications 208. Monitor 102 may be configured to clean, quarantine, or otherwise neutralize electronic device 104 of applications 208 that were connected to a network destination 106 determined to have hosted malware. Monitor 102 may be configured to send an alert or message to a user or administrator of electronic device 104 requesting permission to conduct any protective act.

In another embodiment, monitor 102 may be configured to protect electronic device 104 by applying behavioral rules to the operation of applications 208. A behavioral rule may comprise one or more rules that describe symptoms of suspicious activity of an active and running process or application. Behavioral rules may be used by a monitoring application to continuously monitor the behavior of a process to observe whether it exhibits the behavior described in the rule. Monitor 102 may be configured to receive a behavioral rule from reputation server 108. A behavioral rule may be of any form suitable to associate malware with an action of an application on electronic device 104. A behavioral rule may comprise a module, functional library, shared library, and/or other suitable mechanism.

If one or more applications 208 have connected to a network destination 106 known to host malware, monitor 102 may be configured to enumerate the open network connections owned by the one or more applications 208. Monitor 102 may be configured to determine the socket for each such connection, other identifying information such as protocol and connection type, and the identity of any network destinations 106 to which applications 208 are connected.

FIG. 3B is an illustration of example information that may be shared between monitor 102 and reputation server 108 concerning network destinations connected to electronic device 104 and associated with an application which in turn is associated with malware. Monitor 102 may be configured to summarize such information as shown in FIG. 3B, or in any other suitable format. Although particular information and formatting is illustrated in FIG. 3B, any suitable information and format can be exchanged between monitor 102 and reputation server 108. Such information may comprise a table 320 of related suspicious connections. Table 320 of related suspicious connections may comprise the identity of the application 324 related to malware hosted on a network destination, and identify all open connections for such application 324. Table 320 of related suspicious connections may also comprise the network address 312 of network destinations connected to application 324. In addition, table 320 of related suspicious connections may comprise the host name 314 of network destinations connected application 324. Furthermore, table 320 of related suspicious connections may include any information suitable to identify the operations of a network connection of or network destination connected to an application 324 related to malware. Monitor 102 may be configured to transmit the information contained in table 320 of related suspicious connections to reputation server 108.

Figure 4:
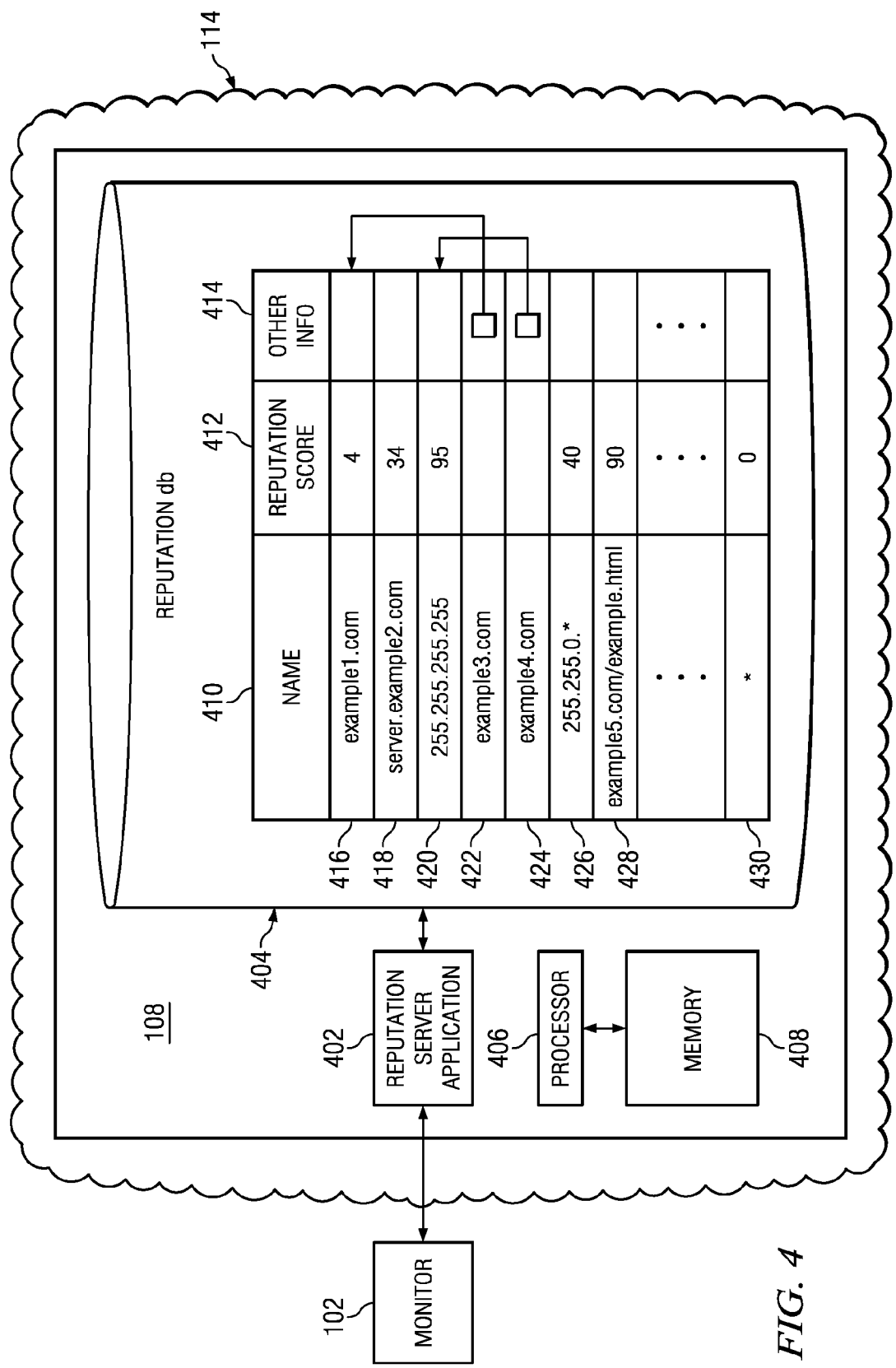
FIG. 4 is an illustration of an example reputation server for tracking the reputation of network destinations according to the network destinations' propensity to host malware.

FIG. 4 is an illustration of an example reputation server 108 for tracking the reputation of network destinations according to the network destinations' propensity to host malware. Reputation server 108 may comprise a reputation server application 402, a reputation database 404, and a processor 406 coupled to a memory 408. Reputation server application 402 may be configured to communicate with monitor 112 and reputation database 404 to track network destinations to determine whether the network destinations are known to host malware.

Reputation server application 402 may comprise any application, process, script, module, executable, server, executable object, library, or other digital entity suitable to interface with monitor 102 and reputation database 404 to track the reputation of network destinations according to the network destination's propensity to host malware. Reputation server application 402 may reside on reputation server 108, or on any other suitable server to track the reputation of network destinations according to the network destination's propensity to host malware. Reputation server application 402 may be communicatively coupled to monitor 102. In one embodiment, reputation server application 402 may be communicatively coupled to monitor 102 over network 114. Reputation server application 402 may be communicatively coupled to reputation database 404. In one embodiment, application 402 may be communicatively coupled to reputation database 102 over network 114. In one embodiment, reputation server application 402 and monitor 102 may be co-located within the same device, application, server, or process. In one embodiment, reputation server application 402 and monitor 102 may comprise functions, modules, libraries, or portions of the same application, server, or process. In such an application, some features or functions of reputation server application 402 and monitor 102 may be redundant, and thus combined. Reputation server application 402 may be configured to perform particular functions or configurations of monitor 102, and vice-versa, where possible. In one embodiment, monitor 102 may be configured to reside on reputation server 108, in memory 408 for execution by processor 406 with instructions contained in memory 408.

Processor 406 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 406 may interpret and/or execute program instructions and/or process data stored in memory 408. Memory 408 may be configured in part or whole as application memory, system memory, or both. Memory 408 may include any system, device, or apparatus configured to hold and/or house one or more memory modules. Each memory module may include any system, device or apparatus configured to retain program instructions and/or data for a period of time (e.g., computer-readable media).

Reputation server application 402 may be configured to receive information from monitor 102 concerning one or more open network connections of electronic device 104. Information from monitor 102 concerning open network connections of electronic device 104 may comprise the identities of one or more network destinations. Reputation server application 402 may be configured to access data contained within reputation database 404 to determine whether or not the network destination is known to host malware. In one embodiment, reputation server application 402 may receive a specific indication from reputation database 404 that a particular network destination is known to host malware. In one embodiment, reputation server application 402 may receive information from reputation database 404 about a particular network destination's propensity to host malware, which reputation server application 402 must use to determine whether to indicate to monitor 102 that the particular network destination is safe, unsafe, and/or known to host malware. Reputation server application 402 may be configured to indicate to monitor 102 whether one or more particular network destinations are known to host malware.

Reputation server application 402 may be configured to populate information in reputation database 404 based upon information received from monitor 102. Reputation server application 402 may be configured to populate reputation database 404 with information associated with a particular network destination, such as that in table 302 of the network destinations, including: the applications 306 associated with each network destinations, the protocol 308 used for each connection, the socket and/or port 310 used for each connection, the network destinations' addresses 312, the network destinations' host names 314, and/or whether the ports are inbound or outbound 316. Reputation server application 402 may be configured to request some or all of such information from monitor 102.

If no entry for a given network destination exists in reputation database 404, reputation server application 402 may be configured to create an entry for the given network destination in reputation database 404. Reputation server application 402 may be configured to give a new entry in reputation database 404 default values. Reputation server application may be configured to associate a new entry in reputation database 404 with an existing entry.

Reputation server application 402 may be configured to receive information from monitor 102 regarding additional network destinations associated with network destinations known to host malware, such as those found on a table 320 of related suspicious connections. Table 320 of related suspicious connections may be configured to indicate that a given application 324 on an electronic device, wherein the application 324 was found to be connected to a network destination associated with malware, may have had connections with additional network destinations. The additional network destinations may comprise destinations that are also associated with malware. Reputation server application 402 may be configured to populate reputation database 404 with the information from table 320 of related suspicious connections. For a given application indicated in table 320 of related suspicious connections, reputation server application 402 may be configured to indicate in reputation database 404 that two network destinations may be associated. In one embodiment, reputation server application 402 may be configured to update an entry in reputation database 404 that a particular network destination is associated with the malicious network destination. In one embodiment, reputation server application 402 may update reputation database 404 with information that a network destination may host malware, wherein the network destination is associated with other network destinations that host the malware.

Reputation database 404 may comprise information associating one or more network destinations and the network destinations' propensity to be associated with or host malware. Reputation database 404 may be configured to be accessible to provide such information. In one embodiment, reputation database may be configured to be accessible by use of database queries from reputation server application 402. Reputation database 404 may reside on reputation server 108. Reputation database 404 may reside in memory 408, or another such memory. Reputation database 404 may be configured in any manner suitable for providing information associating one or more network destinations and the network destinations' propensity to be associated with or host malware. Reputation database 404 may be implemented in a database, file, record, module, library, or any other suitable mechanism. Reputation database 404 may contain any number of entries 416-428 for various network destinations. Reputation database 404 may comprise one or more categorizations, classifications and/or evaluations of a particular network destination or group of network destinations in regards to the destination's association with malware. In one embodiment, each entry in reputation database 404 may contain a domain field 410, a reputation score field 412, and/or one or more fields for other information 414.

Domain field 410 may be configured to indicate the network destination or group of network destinations for which data is stored in reputation database 404. In one embodiment, domain field 410 may comprise the internet address, or internet address range of a domain, host, or other network destination. In one embodiment, domain field 410 may comprise the name of a universal resource locator ("URL"), domain, subdomain, host, or other network destination.

Reputation score field 412 may comprise a reputation score for the domain indicated in domain field 410. A reputation score may indicate a quantitative rating of the soundness of the host in terms of a lack of unwanted or malicious behavior. A reputation score may be calculated and maintained by any acceptable way for determining the soundness of a domain in terms of a lack of unwanted or malicious behavior. Many factors may be used to determine reputation score, including but not limited to: whether the domain is a source of spam messages; whether the domain is the destination of links contained in spam messages; whether the domain is the destination of links contained is electronic messages that in turn contain malware; whether the domain is linked to by other domains or servers that hose malware; the frequency and volume of electronic messages or traffic to or from the domain; the destination or source of electronic messages or traffic to or from the domain; the reputation of other domains hosted on the same servers or network as the domain; whether the domain's content is malware-free; whether the site host of the domain is deviating from known historical behavior; whether the domain is accessed by applications connecting to domains with bad reputation; or whether the domain appears on a blacklist (indicating malicious sites) or a whitelist (indicating safe sites). The entries in reputation score field 412 may change as new information is used to populate reputation database 404. In one embodiment, the value of reputation score field 412 may range from 0 to 100, wherein 0 indicates the least degree of trustworthiness, and 100 indicates the greatest degree of trustworthiness of the domain. In one embodiment, a new entry into reputation database 404 without an existing reputation is assigned a 0 for its reputation score. In one embodiment, a default entry such as "*" 430 may have a reputation score of 0.

Reputation database 404 may comprise one or more fields for other information 414. Fields 414 may comprise information regarding various factors contributing to reputation score 412. In one embodiment, field 414 may comprise information with regards to a related domain, wherein the database entry is associated, by way of a common application running on an electronic device, to another entry in reputation database 404.

In one embodiment, reputation database 404 may comprise a field indicating whether or not a domain is associated with malware. In such an embodiment, reputation database 404 may comprise a binary representation that a domain is associated with malware. In one embodiment, reputation database 404 may comprise a field indicating one or more kinds of malware that a domain is associated with.

Reputation server application 402 may be configured to query reputation database 404 to receive information about a particular network destination. In one embodiment, reputation database 404 may be configured to return a reputation score 412 for a particular domain 410, wherein the domain 410 corresponds to the network destination that was queried. In one embodiment, reputation database 404 may be configured to return a binary indication that the domain 410 is associated with malware. In one embodiment, reputation database 404 may be configured to return an indication of the kind of malware with which the domain 410 is associated. Reputation server application 402 may be configured to interpret the results of the query from reputation database 404. In one embodiment, reputation server application 402 may be configured to interpret a reputation score 412 from reputation database 404. In such an embodiment, reputation server application 402 may be configured to apply a threshold to a reputation score 412. For example, reputation server application 402 may be configured to determine that a domain 410 with a reputation score 412 of less than 80 may be deemed as associated with malware, for the purposes of the present disclosure. Reputation server application 402 may be configured so as to minimize false positive identifications of applications connected to network destinations associated with malware. In one embodiment, reputation server application 402 may be configured to determine that a domain 410 with a reputation score 412 of less than 5 may be deemed as associated with malware, for the purposes of the present disclosure. In one embodiment, reputation server application 402 may be configured to determine that if a domain 410 is associated with a particular kind of malware as indicated by reputation database 404, then the domain may be deemed as associated with malware as according to the present disclosure.

In operation, in FIG. 1 a monitor 102 may be operating to scan electronic device 104 for possible malware that communicate with network destinations 106 to carry out malicious activities. Monitor 102 may communicate with reputation server 108 to determine whether applications or network connections belonging to electronic device 104, or network destinations 106 connected through network 112 to electronic device 104 comprise malware or malicious activities associated with malware.

In one embodiment, monitor 102 may be running on a cloud computing scheme. In another embodiment, monitor 102 may be operating on a machine in network 110. In yet another embodiment, monitor 102 may be operating on electronic device 104. In still yet another embodiment, monitor 104 may be operating on a machine in network 114. In one embodiment, reputation server 108 may be running on a machine in network 114. In a further embodiment, reputation server 108 and monitor 104 may be running on the same machine.

In operation (and referring to FIGS. 1-4 collectively), one or more applications 208 may be running on electronic device 104. One or more applications 208 may be communicating with one or more network destinations 106 through network device 206. The network device 206 may be operational. Monitor 102 may determine and enumerate the open network connections of network device 206 for network device 206. Monitor 102 may determine the connection type, the direction of the connection, the IP addresses and/or host names of network destinations 106, and/or which applications 208 are using the connection.

Monitor 102 may compile table 302 of the network destinations, and for each the applications 306 associated with each network destinations, the protocol 308 used for each connection, the socket and/or port 310 used for each connection, the network destinations' addresses 312, the network destinations' host names 314, and/or whether the ports are inbound or outbound 316.

Monitor 102 may communicate some parts of table 302 of the network destinations to reputation server 108 to determine the reputation of network destinations 106. Monitor 102 may be configured to send additional information concerning network destinations 106 or the applications 208 of electronic device 104 if reputation server 108 determines that network destinations 106 may be known to host malware, and/or upon request from reputation server 108.

Reputation server 108 may receive table 302 of the network destinations. Reputation server application 402 may be running on reputation server 108. Reputation server application 402 may receive table 302 of the network destinations. Reputation server application 402 may access data contained within reputation database 404 to determine whether or not the network destinations of table 302 of network destinations is known to host malware. Reputation server application 402 may query reputation database 404 to obtain the reputation score 412 of each network destination. For example, in reputation database 404, "example1.com" 416 may have a reputation score of 4; "server.example2.com" 418 may have a reputation score of 34; "255.255.255.255" 420 may have a reputation score of 95; "example3.com" 422 may not yet exist, or may not have a reputation score; "example4.com" 424 may not yet exist, or may not have a reputation score; all addresses within the subdomain "255.255.255.*" 426 may have a reputation score of 40; and "example5.com/example.html" 426 may have a reputation score of 90.

Reputation server application 402 may interpret the results from reputation database 404 to determine whether the network destinations are known to be associated with malware. In one embodiment, reputation server application 402 may determine that one or more network destinations have an unacceptably low reputation score. In one embodiment, reputation server application 402 may apply a reputation score threshold of 80, below which it may determine the network destination is known to be associated with malware. For example, reputation server application 402, using a reputation score threshold of 80, may determine that "example1.com" and "server.example2.com" are malware hosts. Reputation server application 402 may determine that "255.255.255.255" poses no threat. Reputation server application 402 may communicate to monitor 102 that "example1.com" and "server.example2.com" are malware hosts.

Monitor 102 may receive the evaluation of network destinations 106 from reputation server 108. Monitor 102 may protect electronic device 104 based on information that one or more network destinations 106 are known to host malware. Monitor 102 may protect electronic device 104 directly, through active or passive methods. In one embodiment, monitor 102 may block access to network destinations 106 known to host malware. Monitor 102 may clean electronic device 104 of applications 208 connected to a network destination 106 known to host malware. For example, APP1 208a may be connected to example1.com 106a. Information received from reputation server 108 may indicate that example1.com 106a is a host for malware. Thus, monitor 102 may treat APP1 208a like malware. In one embodiment, monitor 102 may diagnose an application, such as APP1 208a, as malware by its connection to a network destination with a known association with malware, such as example1.com 106a. For example, monitor 102 may clean electronic device 104 of APP1 208a and APP2 208b. Monitor 102 may undo modifications to electronic device 104 made in relation to malware of a network destination 106 or one or more diagnosed applications 208, such as APP1 208a. Monitor 102 may monitor the behavior of one or more applications 208 connected to a network destination 106 hosting malware. Monitor 102 may send an alert or message to a user or administrator of electronic device 104 requesting permission to conduct any protective act.

If one or more applications 208 have connected to a network destination 106 known to host malware, monitor 102 may enumerate the other open network connections owned by one or more applications 208. Monitor 102 may determine the socket for each such connection, other identifying information such as protocol and connection type, and the identity of any network destinations 106 to which one or more applications 208 are connected. Monitor 102 may summarize such information as shown in FIG. 3B in a table 320 of related suspicious connections. Table 320 of related suspicious connections may contain the identity of the application 324 related to malware hosted on a network destination, and identify all open connections for such application 324. For example, APP1 208a and APP2 208b may have been determined to be connected to network destinations hosting malware. Thus, table 320 of related suspicious connections may enumerate the other network destinations to which APP1 208a and APP2 208b are connected. APP1 208a may be connected to "example1.com" 106a and to "example3.com" 106d. APP2 208b may be connected to "server.example2.com" 106b and to "example4.com" 106d. Monitor 102 may transmit the information contained in table 320 of related suspicious connections 324 to reputation server 108. In one embodiment, monitor 102 may transmit such information with the original submission of table 304 of network destinations. In one embodiment, reputation server application 402 may be able to determine such information with table 304 of network destinations. In one embodiment, table 320 of related suspicious connections may also comprise the actual binaries, files, or other data downloaded from the network destination 106, or the actual binaries of applications 208 connected to a network destination 106 known to host malware. Monitor 106 may submit such data to the reputation server 108.

Reputation server application 402 may populate information in reputation database 404 based upon information received from monitor 102. Reputation server application 402 may populate reputation server 404 with information from table 304 of network destinations, and/or with information from in a table 320 of related suspicious connections. Reputation server application 402 may request some or all of such information from monitor 102. If no entry for a given network destination existed in reputation database 404, reputation server application 402 may create an entry for the given network destination in reputation database 404, and reputation server 108 may begin tracking the reputation of the network destination. Reputation server application 402 may update a reputation score 412 for an entry which was reported by monitor 102 as connected to by one or more applications 208 which also connected to a network destination 106 known to host malware. In one embodiment, reputation server application 402 may indicate in reputation database 404 the association between two such network destinations. For example, monitor 102 may have determined that APP1 208a may have connected to a malware network destination such as example1.com 106a, and also to a network destination such as example3.com, for which there is no known association with malware. In one embodiment, reputation server application 402 may update the reputation score 412 of "example3.com" in reputation database 404 with the same reputation as "example1.com." In one embodiment, reputation server application 402 may indicate in a field 414 that the entry for "example3.com" is linked to "example1.com." Similarly, reputation sever application 402 may indicated in a field 414 that the entry for "example4.com" is linked to "server.example2.com." Reputation database 404 may recalculate the reputation score for entries that are associated with other entries known to host malware.

Reputation server application 402 may create a behavioral rule for application on electronic device 104. The behavioral rule may identify all applications, binaries, and content found by monitor 102 to be connecting to a network destination known to host malware as malware. The behavioral rule may be transmitted to and applied by monitor 102, or any another suitable application. The behavioral rule may indicate that an application will access polymorphic servers, such as those network destinations known to be associated with malware.

Figure 5:
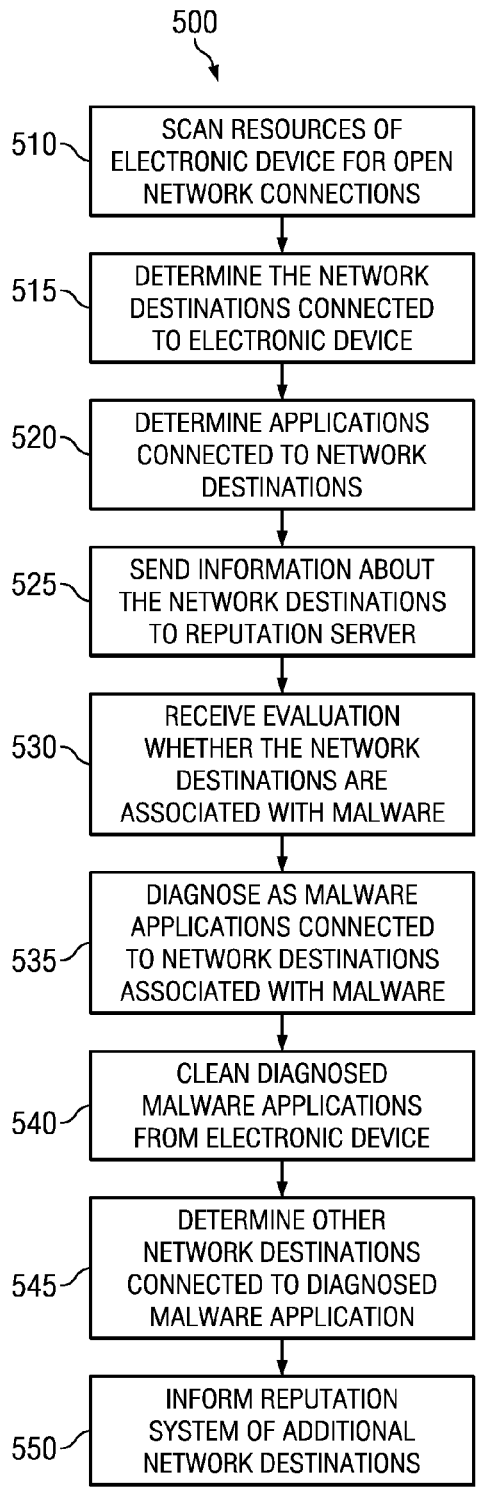
FIG. 5 is an illustration of example method to detect malware that contact a network destination from an electronic device.

FIG. 5 is an illustration of example method 500 to detect malware that contact a network destination from an electronic device. In step 510, the resources of an electronic device may be scanned for open network connections. Open network connections may provide communication between one or more applications on the electronic device to one or more network destinations. In step 515, the one or more network destinations connected to the electronic device may be determined. In step 520, the one or more applications in communication with the one or more network destinations may be determined. Information associated with each destination, and with the connection, may be collected, including but not limited to: the applications associated with each network destinations, the protocol used for each connection, the socket and/or port used for each connection, the network destinations' addresses, the network destinations' host names, and/or whether the ports are inbound or outbound.

In step 525, information about the detected network destinations and/or the connections to the electronic device may be sent to a reputation server. The information may comprise the information collected as described above. In step 530, an evaluation may be received from the reputation server. The evaluation may comprise a determination of whether a given network destination is known to be associated with malware. In step 535, any applications that are in communication with a network destination evaluated to be associated with malware may be diagnosed as malware. In step 540, the diagnosed malware applications may be cleaned from the electronic device. Any appropriate step to protect the electronic device from the diagnosed malware application, or from the network destinations evaluated to be associated with malware, may be taken. In one embodiment, the user or administrator of the electronic device may be queried as to what action should be taken. In one embodiment, the activity of a diagnosed malware application may be monitored.

In step 545, other network destinations that are connected to diagnosed malware applications may be identified. The other network destinations may comprise a network destination associated with malware. Information about such network destinations, including the link to the diagnosed malware application and/or network destination associated with malware may be collected. In step 550, the reputation system may be informed about the other network destinations that may comprise a network destination associated with malware, along with any related information.

Figure 6:
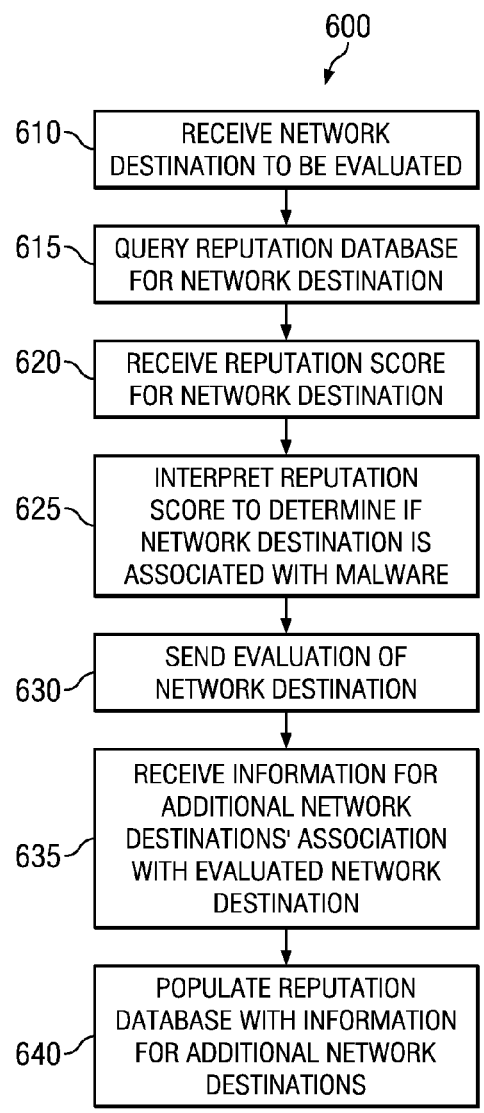
FIG. 6 is an illustration of example method to evaluate network destinations as to their association with malware.

FIG. 6 is an illustration of example method 600 to evaluate network destinations as to their association with malware. In step 610, a network destination to be evaluated may be received from a monitor, the monitor scanning an electronic device. In step 615, a reputation database containing information about various network destinations may be queried regarding the network destination to be evaluated. In step 620, a response from the reputation database may be received. In one embodiment, the response from the reputation database may comprise a reputation score. In one embodiment, the response from the reputation database may be an indication that the network destination is associated with malware. In one embodiment, the response from the reputation database may be an indication that the network destination is associated with a particular kind of malware.

In step 625, the response from the reputation database may be interpreted to determine whether the network destination is associated with malware. In one embodiment, a reputation score may be compared to a threshold score, above or below which the network destination may be determined to be associated with malware. In a further embodiment, such a threshold may be 80, and values below which represent network destinations associated with malware. In one embodiment, an indication that the network destination is associated with a particular kind of malware may be interpreted as meaning that the network destination is associated with malware. In step 630, the evaluation may be sent to the monitor.

In step 635, information may be received from the monitor concerning whether any additional network destinations were associated with the network destination previously evaluated as associated with malware. An evaluation that a network destination was associated with malware may indicate that other network destinations, communicating with the same application on the electronic device, are also associated with malware. In one embodiment, such information may be received with the initial reception of network destinations to be evaluated. In one embodiment, such information may be received after a network destination has been evaluated as associated with malware. In one embodiment, such information may be received upon a request to the monitor.

In step 640, the reputation database may be populated with information received from the monitor. In one embodiment, the reputation database may be populated with information from the monitor concerning additional network destinations that are associated with previously evaluated network destinations. In a further embodiment, the previously evaluated network destinations were evaluated as associated with malware. In one embodiment, an entry in the reputation database may be populated with an indication of a link to another entry. In one embodiment, the reputation database field for reputation score may recalculated based upon new information populated into the reputation database. In one embodiment, a new entry may be created for a network destination previously unaccounted for in the reputation database. In one embodiment, an additional network destination with an association with a malware network destination may be given a reputation score of the associated malware network destination.

Methods 500 and 600 may be implemented using the system of FIGS. 1-4, or any other system operable to implement methods 500 and 600. As such, the preferred initialization point for methods 500 and 600 and the order of the steps comprising methods 500 and 600 may depend on the implementation chosen. In some embodiments, some steps may be optionally omitted, repeated, or combined. In some embodiments, some steps of method 500 may be accomplished in method 600, and vice-versa. In some embodiments, methods 500 and 600 may be combined. In certain embodiments, methods 500 and 600 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. At least one non-transitory machine accessible storage medium having code stored thereon, the code, when executed on an electronic device, to cause the electronic device to:
   identify a process residing in at least a portion of memory of the electronic device;
   provide, over a network, identity information of the network destination to which the process is to communicate, the identity information to include a uniform resource location ("URL") of the network destination;
   receive an indication of reputation information about the network destination;
   identify, based at least in part on the received indication of reputation information, the process as malware, wherein the identification includes a determination of whether the received indication of reputation information indicates that the network destination is associated with malware; and
   responsive to the identification of the process as malware, take at least one of the following actions to protect the electronic device from the malware: block, clean, quarantine, or remove the process.

2. The medium of claim 1, wherein the provided identity information of the network destination to which the process is to communicate further includes an Internet Protocol ("IP") address of the network destination.

3. The medium of claim 1, wherein the identification further includes a determination whether the URL of the network destination matches a URL in a whitelist of sites known to be safe.

4. The medium of claim 1, wherein the identification further includes a determination of whether the received indication of reputation information indicates that the network destination previously hosted other applications with malicious reputation.

5. The medium of claim 1, wherein the electronic device is further caused to send a log of information to a reputation server, the log to include an Internet Protocol ("IP") address of the network destination and information of the process.

6. The medium of claim 1, wherein the identification further includes a determination of whether the received indication of reputation information indicates that the network destination is referred by another network destination with a malicious reputation.

7. The medium of claim 1, wherein:
   the code, when executed on the electronic device, further causes the electronic device to receive a behavioral rule for at least the process; and the action to protect the electronic device from the malware includes an application of the behavioral rule to the process.

8. A method for security, comprising:
identifying a process residing in at least a portion of memory of an electronic device;
providing, over a network, identity information of the network destination to which the process communicates, the identity information including a uniform resource location ("URL") of the network destination;
receiving an indication of reputation information about the network destination receive an indication of reputation information about the network destination;
identifying, based at least in part on the received indication of reputation information, the process as malware, wherein the identification includes determining whether the received indication of reputation information indicates that the network destination is associated with malware; and
responsive to the identification of the process as malware, taking at least one of the following actions to protect the electronic device from the malware: blocking, cleaning, quarantining, or removing the process.

9. The method of claim 8, wherein the provided identity information of the network destination to which the process is to communicate further includes an Internet Protocol ("IP") address of the network destination.

10. The method of claim 8, wherein identifying the process as malware further includes determining whether the URL of the network destination matches a URL in a whitelist of sites known to be safe.

11. The method of claim 8, wherein identifying the process as malware further includes determining whether the received indication of reputation information indicates that the network destination previously hosted other applications with malicious reputation.

12. The method of claim 8, further comprising sending a log of information to a reputation server, the log including an Internet Protocol ("IP") address of the network destination and information of the process.

13. The method of claim 8, wherein identifying the process as malware further includes determining whether the received indication of reputation information indicates that the network destination is referred by another network destination with a malicious reputation.

14. An apparatus, comprising:
a hardware processor;
at least one machine accessible storage medium communicatively coupled to the processor;
instructions stored on the medium, the instructions, when executed by the processor, configure the processor to:
identify a process residing in at least a portion of memory of the apparatus;
provide, over a network, identity information of a network destination to which the process is to communicate, the identity information to include a uniform resource locator ("URL") of the network destination;
receive an indication of reputation information about the network destination;
identify, based at least in part on the received indication of reputation information, the process as malware, wherein the identification includes a determination of whether the received indication of reputation information indicates that the network destination is associated with malware; and
responsive to the identification of the process as malware, take at least one of the following actions to protect the apparatus from the malware: block, clean, quarantine, or remove the process.

15. The apparatus of claim 14, wherein the processor is further configured to provide an Internet Protocol ("IP") address of the network destination in the provided identity information of the network destination to which the process is to communicate.

16. The apparatus of claim 14, wherein the processor is further configured to identify the process as malware further based on a determination of whether the URL of the network destination matches a URL in a whitelist of sites known to be safe.

17. The apparatus of claim 14, wherein the processor is configured to identify the process as malware further based on a determination of whether the received indication of reputation information indicates that the network destination previously hosted other applications with malicious reputation.

18. The apparatus of claim 14, wherein the processor is further configured to send a log of information to a reputation server, the log to include an Internet Protocol ("IP") address of the network destination and information of the process.

19. The apparatus of claim 14, wherein the processor is configured to identify the process as malware further based on a determination of whether the received indication of reputation information indicates that the network destination is referred by another network destination with a malicious reputation.

20. The apparatus of claim 14, wherein:
the instructions stored on the medium, when executed by the processor, further configure the processor to receive a behavioral rule for at least the process; and
the action to protect the apparatus from the malware includes an application of the behavioral rule to the process.

* * * * *